US012385551B2

(12) United States Patent
Hicks et al.

(10) Patent No.: US 12,385,551 B2
(45) Date of Patent: Aug. 12, 2025

(54) MOTOR-GEARBOX ARRANGEMENT

(71) Applicant: Involution Technologies Limited, Warwickshire (GB)

(72) Inventors: Raymond J. Hicks, Chipping Camden (GB); Frank Cunliffe, Chipping Camden (GB)

(*) Notice: Subject to any disclaimer, the term of this patent is extended or adjusted under 35 U.S.C. 154(b) by 0 days.

(21) Appl. No.: 18/255,706

(22) PCT Filed: Dec. 1, 2021

(86) PCT No.: PCT/IB2021/061176
§ 371 (c)(1),
(2) Date: Jun. 2, 2023

(87) PCT Pub. No.: WO2022/118212
PCT Pub. Date: Jun. 9, 2022

(65) Prior Publication Data
US 2024/0003409 A1     Jan. 4, 2024

(30) Foreign Application Priority Data

Dec. 2, 2020 (GB) .................................... 2019011
Sep. 13, 2021 (GB) .................................... 2113032

(51) Int. Cl.
*F16H 3/72* (2006.01)
*B60K 1/02* (2006.01)
(Continued)

(52) U.S. Cl.
CPC .............. *F16H 3/725* (2013.01); *B60K 1/02* (2013.01); *B60K 17/08* (2013.01); *F16H 3/728* (2013.01);
(Continued)

(58) Field of Classification Search
CPC .......... F16H 3/725; F16H 3/728; F16H 61/66; F16H 2061/6603; F16H 2200/0021; F16H 2200/201; F16H 2200/2043; B60K 17/08
See application file for complete search history.

(56) References Cited

U.S. PATENT DOCUMENTS 9,394,975 B1   7/2016   Calvert et al.
9,840,140 B1*   12/2017   Holmes ................... F16H 3/728
(Continued)

FOREIGN PATENT DOCUMENTS

CN     102555791 B    6/2014
EP      3517347 A1    7/2019
(Continued)

OTHER PUBLICATIONS

World Intellectual Property Organization, International Search Report and Written Opinion for International Application No. PCT/IB2021/061176, mail date Feb. 14, 2022, 17 total pages.
(Continued)

*Primary Examiner* — Edwin A Young
(74) *Attorney, Agent, or Firm* — SoCal IP Law Group LLP; Jonathan Pearce

(57) ABSTRACT

A motor-gearbox arrangement, comprising a gearbox arranged to as to selectively couple a first input and a second input to the output via a plurality of epicyclic gears a first electric motor coupled to the first input so as to rotate the first input; and a second electric motor coupled to the second input so as to rotate the second input; in which the clutches and the epicyclic gears which are connected to the input and the output and to other epicyclic gears of the gear train.

17 Claims, 10 Drawing Sheets

(51) Int. Cl.
  *B60K 17/08* (2006.01)
  *F16H 61/66* (2006.01)

(52) U.S. Cl.
  CPC ..... *F16H 61/66* (2013.01); *F16H 2061/6603* (2013.01); *F16H 2200/0021* (2013.01); *F16H 2200/201* (2013.01); *F16H 2200/2043* (2013.01)

(56) References Cited

U.S. PATENT DOCUMENTS

| | | | |
|---|---|---|---|
| 11,421,759 B2* | 8/2022 | McGrew, Jr. | F16H 3/725 |
| 2003/0027682 A1 | 2/2003 | Schmidt | |
| 2005/0096170 A1 | 5/2005 | Holmes | |
| 2012/0065016 A1* | 3/2012 | Tamai | F16H 3/728 |
| | | | 475/5 |
| 2014/0100071 A1 | 4/2014 | Kimes | |
| 2020/0307817 A1 | 10/2020 | Dubreuil et al. | |
| 2020/0331336 A1 | 10/2020 | Kaltenbech et al. | |

FOREIGN PATENT DOCUMENTS

| | | |
|---|---|---|
| WO | 03035421 A1 | 5/2003 |
| WO | 2010109162 A2 | 9/2010 |
| WO | 2019125279 A1 | 6/2019 |
| WO | 2020186023 A1 | 9/2020 |
| WO | 2022118212 A1 | 6/2022 |

OTHER PUBLICATIONS

United Kingdom Intellectual Property Office, Search Report for Application No. GB2019011.2, mail date May 25, 2021, 1 page.
European Intellectual Property Office, Exam Report for European Application No. 21820706.6, mail date May 26, 2025, 6 total pages.

* cited by examiner

MOTOR-GEARBOX ARRANGEMENT

RELATED APPLICATION INFORMATION

This patent claims priority from International PCT Patent Application No. PCT/IB2021/061176, filed Dec. 1, 2021 entitled, "MOTOR-GEARBOX ARRANGEMENT", which claims priority to Great Britain Patent Application No. 2019011.2, filed Dec. 2, 2020 and Great Britain Patent Application No. 2113032.3, filed Sep. 13, 2021, all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

This invention relates to a motor-gearbox arrangement and to a method of controlling such a motor-gearbox arrangement.

Continuously variable transmissions (CVTs) are an efficient way of providing tractive effort to a vehicle, as it provides continuous torque and power to the wheels throughout the speed range without a break in transmission. The transmission can always operate at the optimum speed and power required to meet the specific tractive requirements of the vehicle.

The need to reduce diesel emissions especially in commercial vehicles operating in urban environments has opened up new markets for high power, large torque ratio CVTs, particularly for electric or hybrid driven vehicles.

According to a first aspect of the invention, there is provided a motor-gearbox arrangement, comprising a gearbox comprising:
 a first input;
 a second input;
 an output;
 a plurality of epicyclic gears each comprising the following members:
  a sun gear;
  a planet carrier;
  a plurality of planet gears carried on the planet carrier and each engaging the sun gear; and
  an annular gear engaging each of the planet gears; and
 a plurality of clutches, the plurality of clutches being arranged to as to selectively couple the first input and the second input to the output via the plurality of epicyclic gears;
the motor-gearbox arrangement further comprising:
a first electric motor coupled to the first input so as to rotate the first input; and
a second electric motor coupled to the second input so as to rotate the second input;
in which the clutches and the epicyclic gears define a plurality of states of the gearbox in which in each state the first input and the second input are coupled to the output through at least one of the epicyclic gears to form a gear train, the plurality of states differing from each other in at least one of the selection of the epicyclic gears which form the gear train and the selection of the members of each epicyclic gear which are connected to the input and the output and to other epicyclic gears of the gear train.

Thus, this motor-gear arrangement can provide a continuously variable transmission in which the second, electric, motor can vary the ratio of the gearbox. Thus, the first motor can work at its optimum speed and power. As such, the gearbox may have a ratio, being the number of turns of the output for a single turn of the first input. The ratio may vary dependent upon the rotational speed of the second input and the selected gear arrangement.

There may be at least one pair of states such that, at a crossover rotational speed of the second input, the ratio of the gearbox is the same for the pair of states. The states may form a sequence from a first state through at least one intermediate state to a final state, which each intermediate state forming a pair with the state before and after it in the sequence. Typically, the states of each pair will be such that the ratio varies with rotational speed of the second input in opposite senses in each state of the pair (such that increasing rotational speed in a first sense will increase the ratio in one of each pair but decrease it in the other).

Thus, the states can provide a wider range of ratios than would be possible with a single state and a second motor of a given speed range, and allows transfer between ranges without disconnecting the output from the first and second inputs (that is, with the arrangement under load).

The arrangement may comprise a brake for at least one of the epicyclic gears, the brake being selectively applicable so as to selectively brake a member of the epicyclic gear. At least one state may vary from another state dependent on whether brake brakes its member. Thus, each brake can be used to vary the ratio of the gearbox also.

The motor-gear arrangement may represent an entirely electric drive. The arrangement may comprise a source of electric power for the first and second motors, which may comprise a battery, a fuel cell or a generator.

The epicyclic gears may comprise first, second and third epicyclic gears, and first, second, third and fourth clutches. The first input may be coupled to the planet carrier of the first epicyclic gear and the annular gear of the second epicyclic gear. The second input may be coupled to the sun gears of the first and second epicyclic gear.

The first clutch may selectively couple the planet carrier of the second epicyclic gear to the sun gear of the third epicyclic gear. The second clutch may selectively couple the annular gear of the first epicyclic gear to the sun gear of the third epicyclic gear. The third clutch may selectively couple the planet carrier of the second epicyclic gear to the output. The fourth clutch may selectively couple the annular gear of the first epicyclic gear to the planet carrier of the third epicyclic gear. The annular gear of the third epicyclic gear may be provided with a brake. The planet carrier of the third epicyclic gear may be coupled to the output.

In a first state, the first clutch engages so as to couple the planet carrier of the second epicyclic gear to the sun gear of the third epicyclic gear, and the second, third and fourth clutches disengage so as to not couple anything, and the brake of the annular gear of the third epicyclic gear brakes the annular gear of the third epicyclic gear.

In this state, the first and second motors can be increased from zero speed to a maximum in different senses, with the second motor rotating in a first sense subtracting from the first motor rotating in a second opposite sense. Once the first and second motors reach a maximum speed, the speed of the second motor can be reduced to zero and then increased in the second sense to a maximum so as to increase the ratio and so the speed of the output (given that the speed of the first motor will now be constant).

In a second state, the second clutch engages so as to couple the annular gear of the first epicyclic gear to the sun gear of the third epicyclic gear, with the first, third and fourth clutches disengaged so as to not couple anything, and the brake of the annular gear of the third epicyclic gear brakes the annular gear of the third epicyclic gear.

This state will typically form a pair with the first state. The ratio will then be the same as the first state with the second motor at the maximum speed in the second sense. Decreasing the rotational speed of the second motor to zero and then increasing it to the maximum in the first sense will further increase the ratio and so the speed of the output.

In a third state the third clutch engages so as to couple the planet carrier of the second epicyclic gear to the output, and the first, second and fourth clutches disengage so as to not couple anything. Typically, the brake of the annular gear of the third epicyclic gear would be released.

This state will typically form a pair with the second state. The ratio will then be the same as the second state with the second motor at the maximum speed in the first sense. Decreasing the rotational speed of the second motor to zero and then increasing it to the maximum in the second sense will further increase the ratio and so the speed of the output.

In a fourth state the fourth clutch engages so as to couple the annular gear of the first epicyclic gear to the planet carrier of the third epicyclic gear, and the second, third and fourth clutches disengage so as to not couple anything. Typically, the brake of the annular gear of the third epicyclic gear would be released.

This state will typically form a pair with the third state. The ratio will then be the same as the third state with the second motor at the maximum speed in the second sense. Decreasing the rotational speed of the second motor to zero and then increasing it to the maximum in the first sense will further increase the ratio and so the speed of the output.

The first and second electric motors may be mounted coaxially relative to each other, such that an output of one rotates within an output of the other, with the outputs of each of the motors being coaxial. This can lead to a particularly compact arrangement.

In accordance with a second aspect of the invention, we provide a method of controlling a motor-gearbox arrangement in accordance with the first aspect of the invention, the method comprising varying the rotational speed of the second motor so as to vary the ratio of the gearbox.

Where the first to third epicyclic gears and first to fourth clutches are provided, the method may comprise operating the motor-gearbox arrangement in the first to fourth states sequentially in order. Typically, the method would comprise starting with both inputs at rest, and with the motor-gearbox arrangement in the first state. The method would then comprise increasing the rotational speed of the second input from zero to a maximum in a first sense whilst increasing the rotational speed of the first input from zero to a maximum in a second sense. The method can then comprise, with the first input constant at the maximum speed, reducing the speed of the second input to zero and then to a maximum in the first sense.

The method can then comprise placing the arrangement in the second state and reducing the speed of the second input to zero and then to the maximum in the second sense. The method can then comprise placing the arrangement in the third state and reducing the speed of the second input to zero and then to the maximum in the first sense. The method can then comprise placing the arrangement in the fourth state and reducing the speed of the second input to zero and then to the maximum in the second sense.

DESCRIPTION OF THE DRAWINGS

There now follows, by way of example, embodiments of the invention, described with reference to the accompanying drawings, in which.

DETAILED DESCRIPTION

Figure 1:
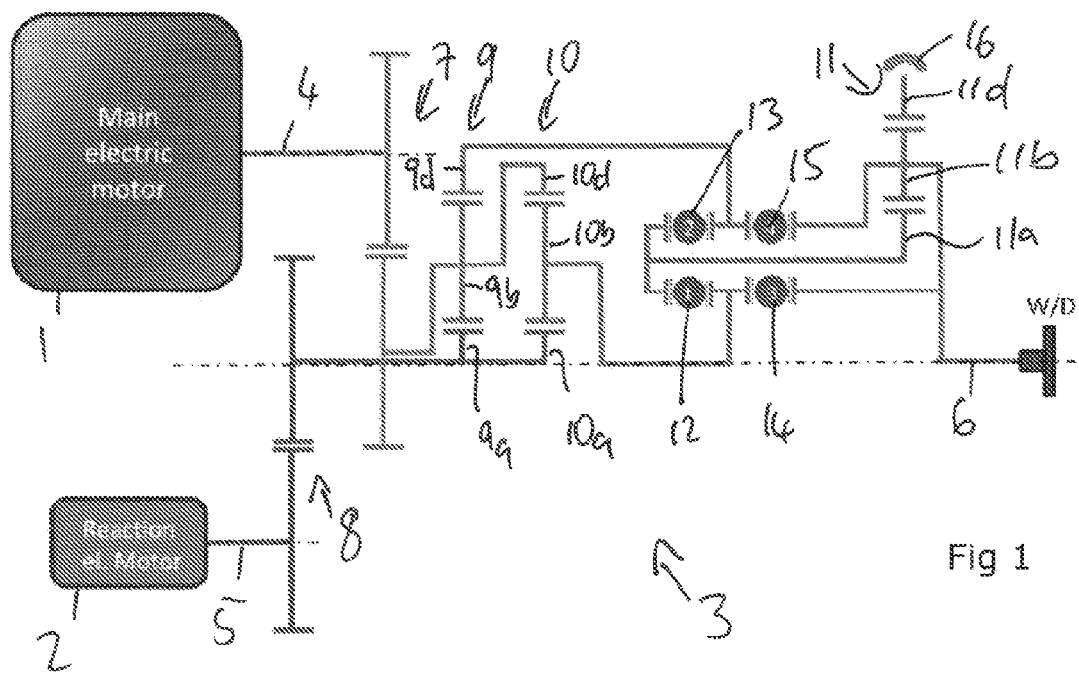
FIG. 1 shows a schematic of a motor-gearbox arrangement in accordance with a first embodiment of the invention.
Figure 2:
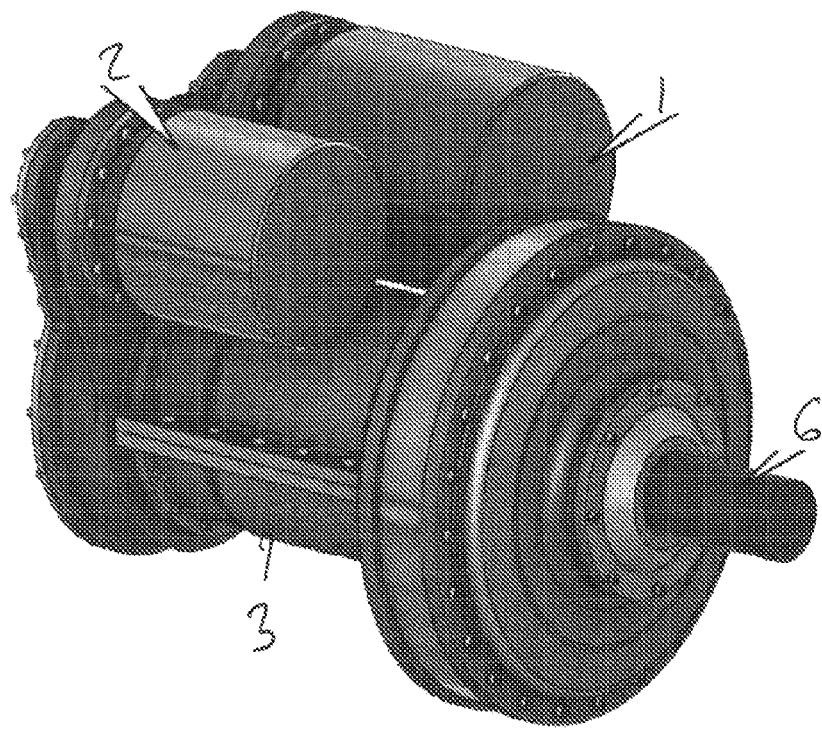
FIG. 2 shows a perspective view of the motor-gearbox arrangement of FIG. 1.
Figure 3:
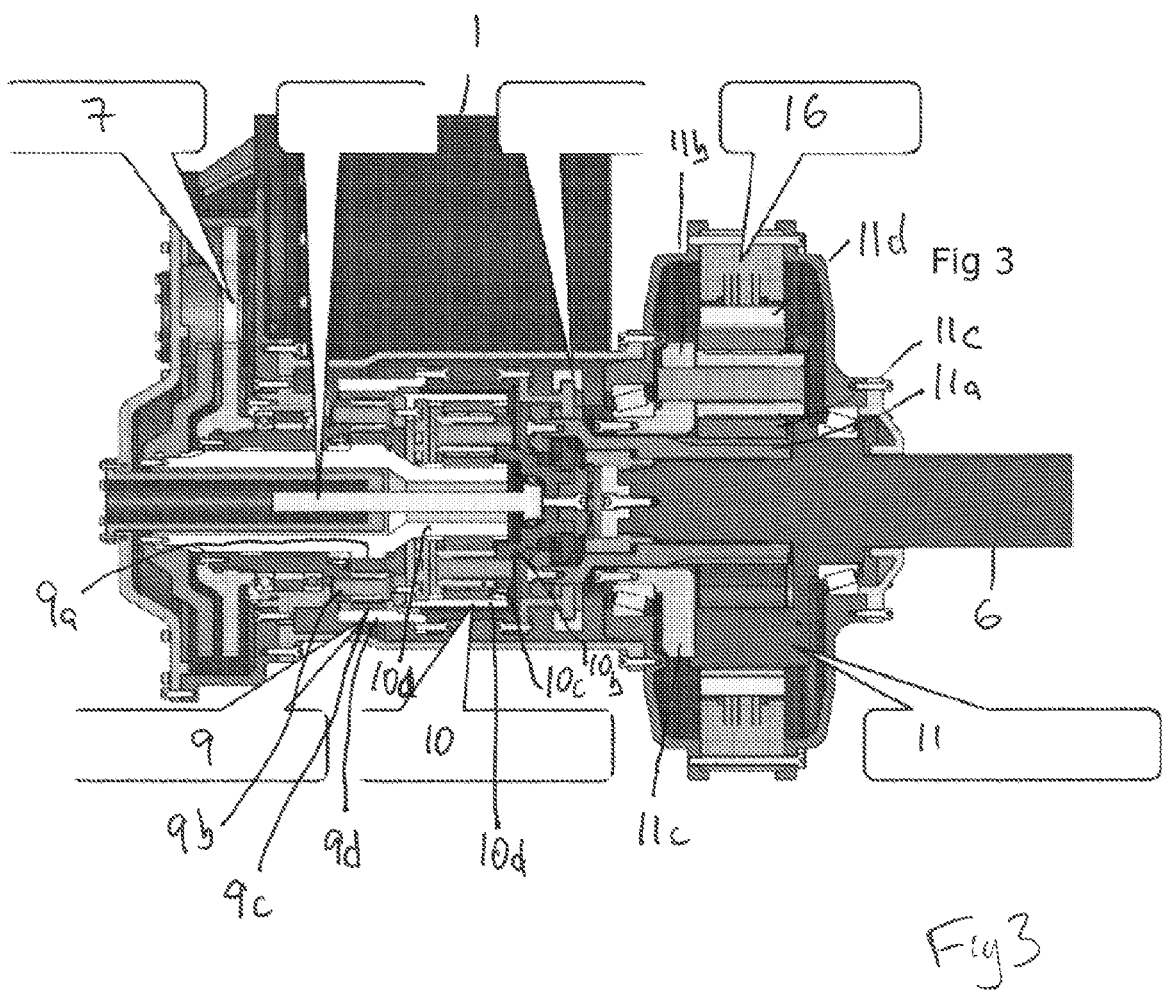
FIG. 3 shows a cross sectional view through the motor-gearbox arrangement of FIG. 1.

A motor-gearbox arrangement in accordance with a first embodiment of the invention will be described with reference to FIGS. 1 to 12 of the accompanying drawings, which provides a continuously variable transmission. In this embodiment, the motor-gearbox arrangement is based around two electric motors: a first, main electric motor 1, and a second, reaction electric motor 2. These electric motors can be powered by any suitable means, but typically would be powered by a generator running from a petrol or diesel internal combustion engine, or a hydrogen fuel cell combined with a battery or simply a battery.

The motor-gearbox arrangement comprises a gearbox 3, which has a first input 4 coupled to the rotor of the first motor 1, and a second input 5 coupled to the rotor of the second motor 2. The gearbox also has an output 6, which would typically be coupled to the road wheels of a vehicle.

The first input 4 is provided with a reduction gear 7; likewise the second input 5 is provided with a reduction gear 8. As will be discussed in more detail, these reduction gears 7, 8 couple into a set of epicyclic gears 9, 10, 11.

The epicyclic gears comprise first 9, second 10 and third 11 epicyclic gears each having a sun gear 9a, 10a, 11a, a planet carrier 9b, 10b, 11b carrying a plurality of planet gears 9c, 10c, 11c, which engage the sun gear 9a, 10a, 11a, and an annular gear 9d, 10d, 11d which engages the planet gears 9c, 10c, 11c. First 12, second 13, third 14 and fourth 15 clutches are also provided.

The first reduction gear 7 is coupled to the planet carrier 9b of the first epicyclic gear 9 and the annular gear 10d of the second epicyclic gear 10. The second reduction gear 8 is coupled to the sun gears 9a, 10a of the first 9 and second epicyclic gears 10.

The first clutch 12 selectively couples the planet carrier 10b of the second epicyclic gear 10 to the sun gear 11a of the third epicyclic gear 11. The second clutch 13 selectively couples the annular gear 9d of the first epicyclic gear 9 to the sun gear 11a of the third epicyclic gear 11. The third clutch 14 selectively couples the planet carrier 10b of the second epicyclic gear 10 to the output 6. The fourth clutch selectively couples the annular gear 9d of the first epicyclic gear 9 to the planet carrier 11b of the third epicyclic gear 11. The annular gear 11d of the third epicyclic gear 11 is provided with a brake 16 to selectively brake that member. The planet carrier 11b of the third epicyclic gear 11 is coupled to the output 6.

The operation of this motor-gearbox arrangement can be demonstrated respect to FIGS. 4 to 12 of the accompanying drawings. The motor-gearbox arrangement has four states, used with increasing output speed, starting with the first state shown in FIGS. 4 and 5 at zero output speed. The graph shown in FIG. 12 of the accompanying drawings can be used to assist in the understanding of the various states; the traces are as follows:

Trace 30 shows the speed of the first motor 1;
Trace 31 shows the power consumption of the second motor 2;
Trace 32 shows the torque at output 6;
Trace 33 shows the power at output 6;
Trace 34 shows the speed of the second motor 2; and
Trace 35 shows the speed of the output 6.

Figure 4:
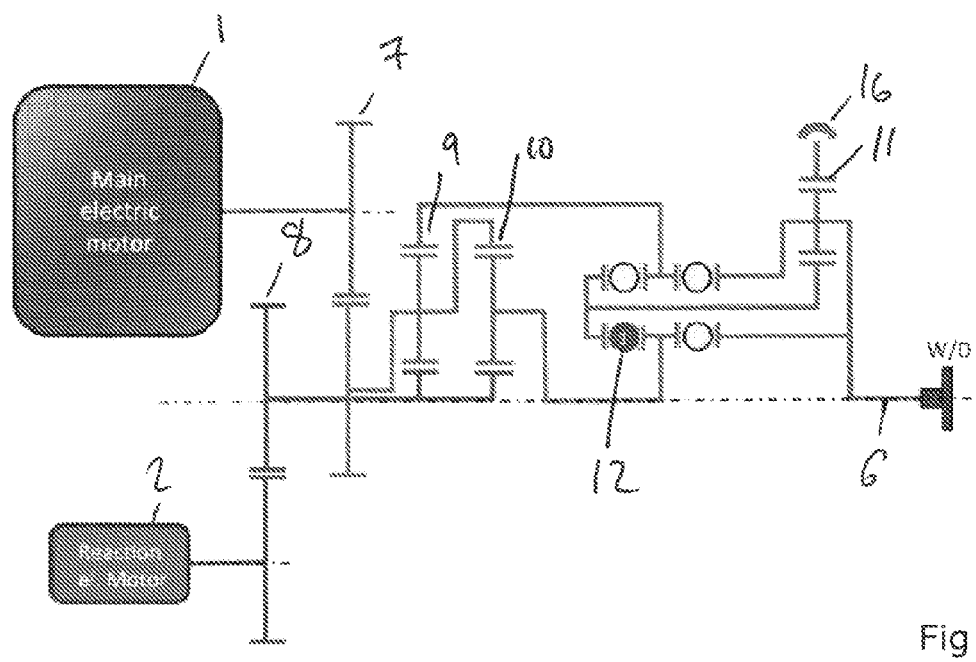
FIGS. 4 and 5 show respectively a schematic and cross sectional view of the motor-gearbox arrangement of FIG. 1, in a first state.
Figure 5:
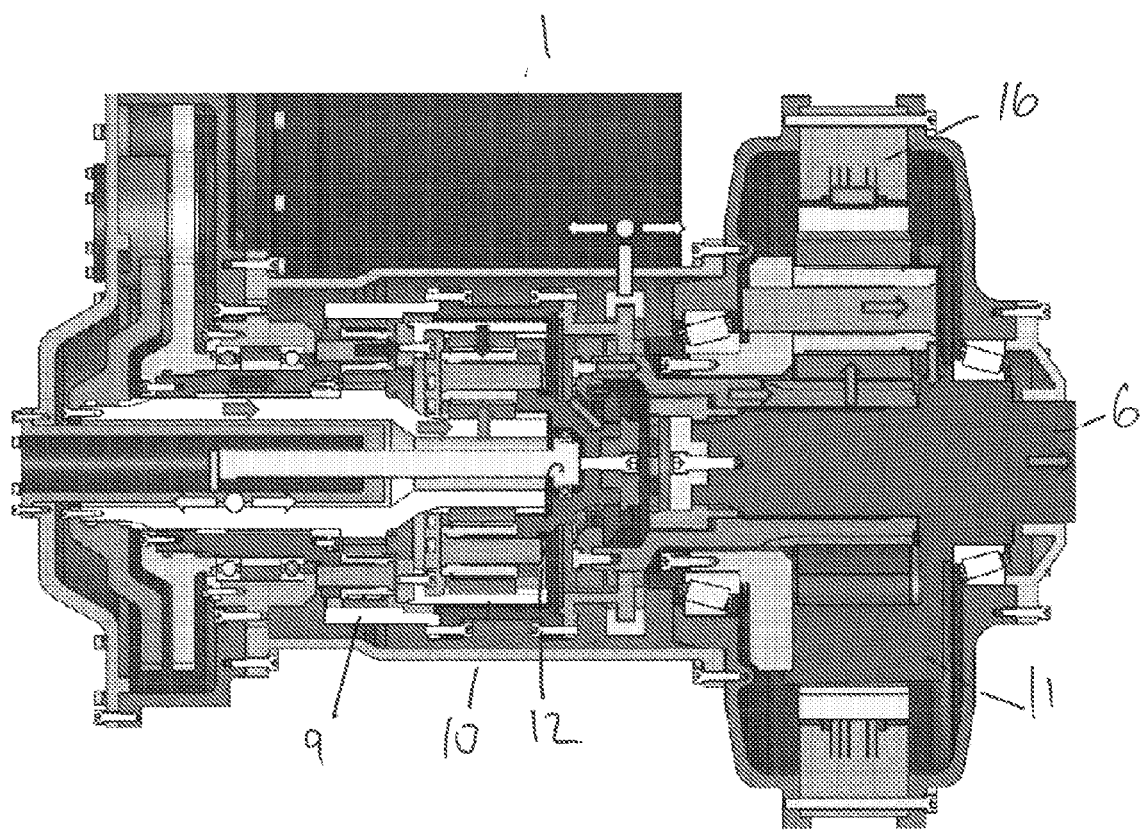
Figure 12:
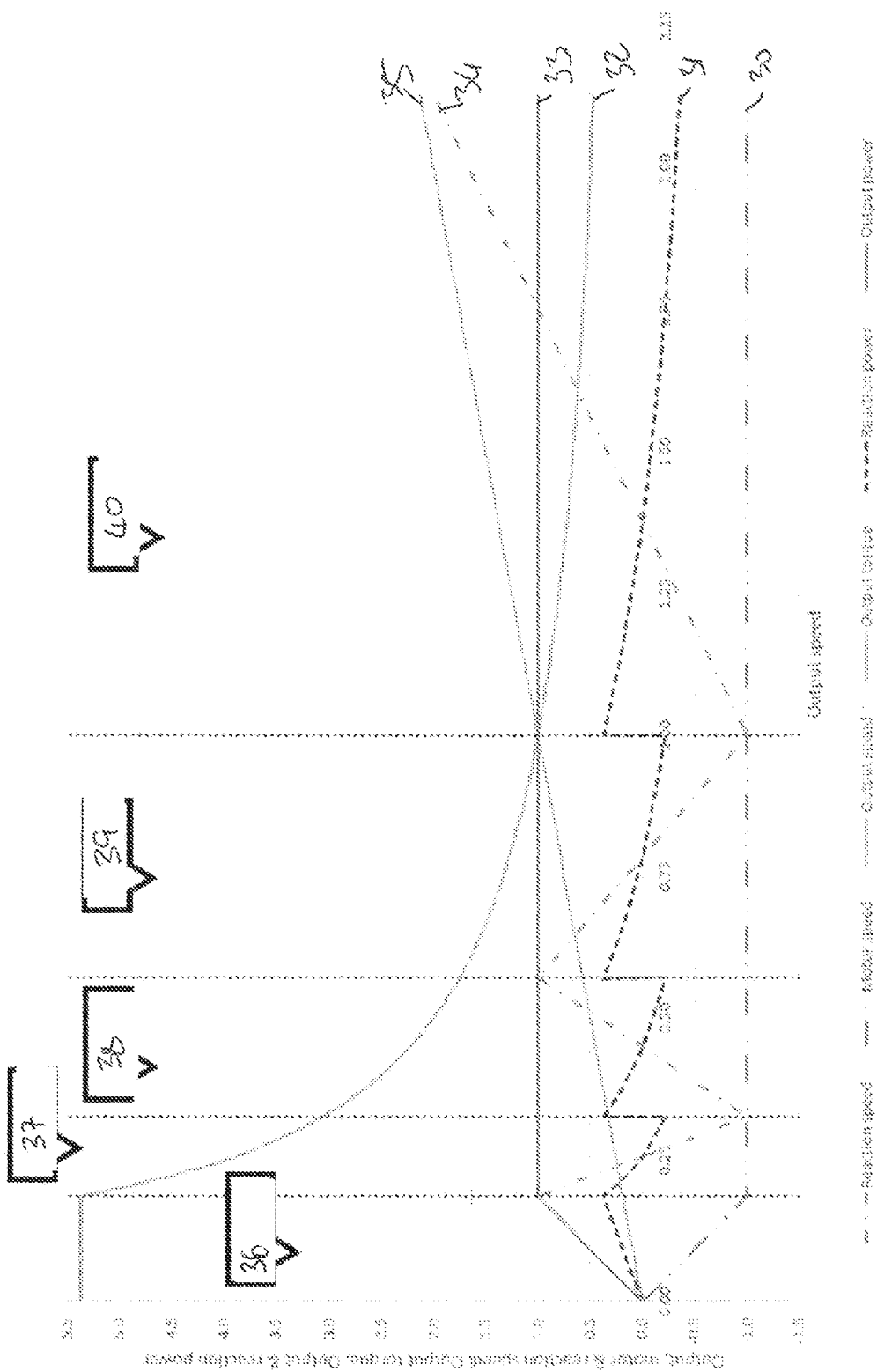
FIG. 12 shows a typical graph of torque, speed and power of the motor-gearbox arrangement of FIG. 1

The first state, shown in FIGS. 4 and 5 of the accompanying drawings starts with both motors 1, 2 at zero speed. The first clutch 12 is engaged (and the other clutches 13, 14, 15 are disengaged). This couples the second 10 and third 11 epicyclic gears between the first 7 and second 8 reduction gears and the output 6. The brake 16 is applied so as to fix the annular gear 11d of the third epicyclic gear. If the first 1 and second 2 motors are driven at increasing speed in opposing directions (say the second motor 2 in a first sense and the first motor 1 in a second sense), then the speed of the second motor will be subtracted from that of the first electric motor, thus reducing the speed of the output 6. This is shown in FIG. 12 as range 36. The third epicyclic gear 11 gives a further (fixed) reduction in output speed.

Once the maximum speeds of the first 1 and second motors 2 is reached, the first motor 1 is kept at constant speed throughout the following procedure. The motor-gearbox arrangement remains in the first state shown in FIGS. 4 and 5. In order to increase the ratio of the gearbox (and so the speed of the output given the constant speed of the first motor 1), the speed of the second motor is decreased through zero (thus reducing the reduction in speed due to the second motor), and increased to a maximum in the second sense (now adding speed to the output 6). This is shown as range 37 in FIG. 12.

Once the maximum speed in the second sense is reached by the second motor 2, the motor-gearbox arrangement reaches a point where the second state (described below) has the same ratio as first state. At this speed, the second clutch 13 is engaged, and momentarily the transmission is locked in a fixed ratio. The first clutch 12 is then released.

Figure 6:
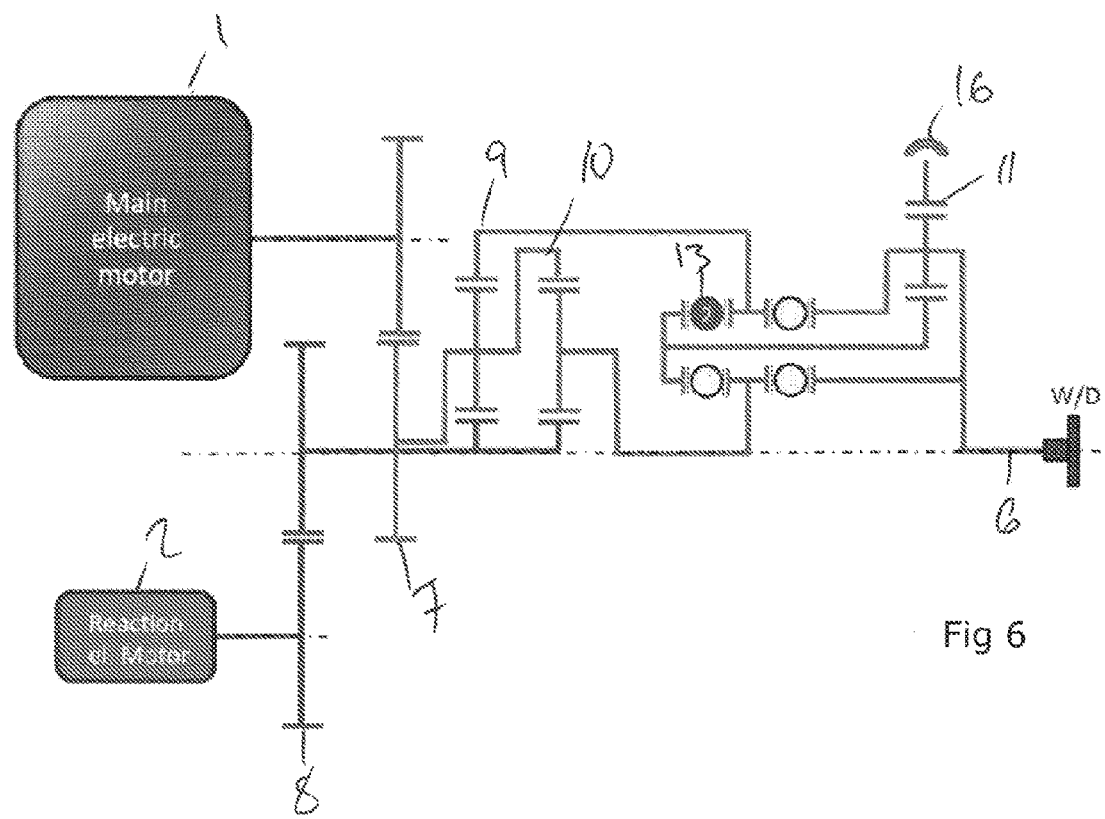
FIGS. 6 and 7 show respectively a schematic and cross sectional view of the motor-gearbox arrangement of FIG. 1, in a second state.
Figure 7:
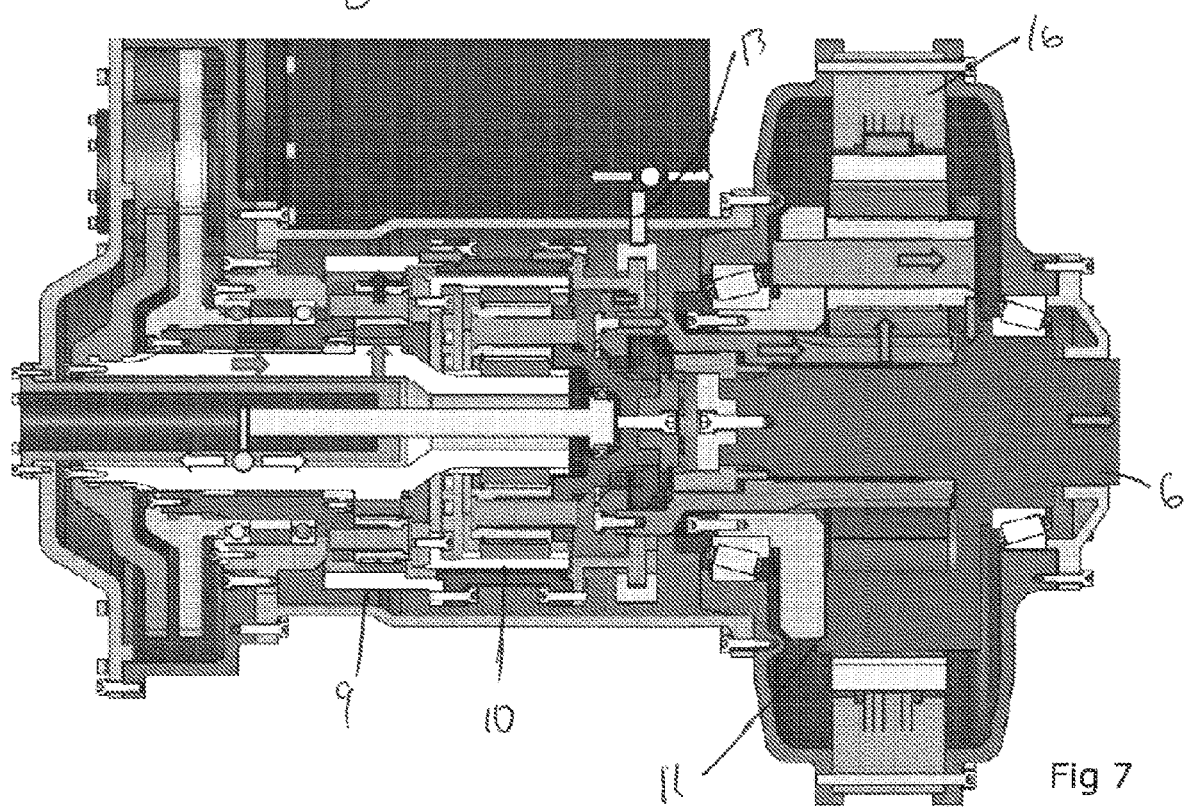

In the second state shown in FIGS. 6 and 7, the second clutch 13 is engaged, but none of the other clutches 12, 14, 15. This couples the first epicyclic gear between the reduction gears 7, 8 and the third epicyclic gear 11 in place of the second epicyclic gear 10. The brake 16 is applied.

With the second motor 2 initially running at maximum speed in the second sense, the speed of the second motor 2 can be reduced to zero, thus increasing the output 6 speed, and increased to the maximum in the first sense, further increasing the output 6 speed. This is shown in range 38 in FIG. 12.

Once the maximum speed in the first sense is reached by the second motor 2, the motor-gearbox arrangement reaches a point where the third state (described below) has the same ratio as the second state. At this speed, the third clutch 14 is engaged, and momentarily the transmission is locked in a fixed ratio. The second clutch 13 is then released.

Figure 8:
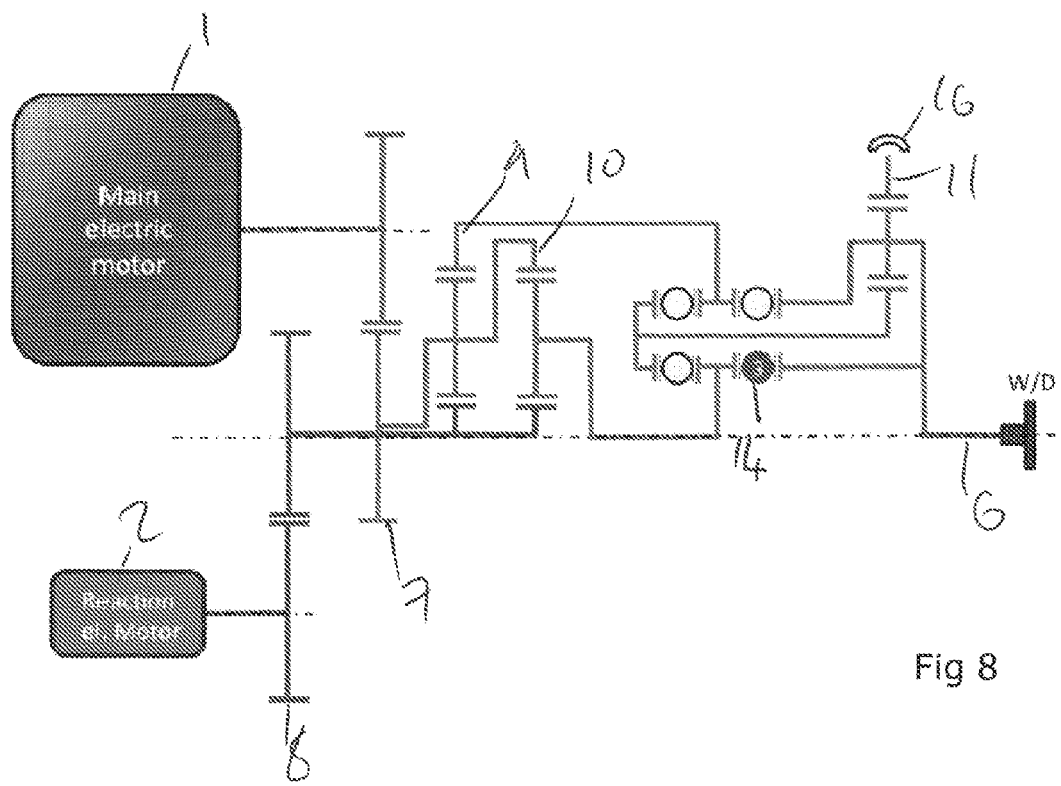
FIGS. 8 and 9 show respectively a schematic and cross sectional view of the motor-gearbox arrangement of FIG. 1, in a third state.
Figure 9:
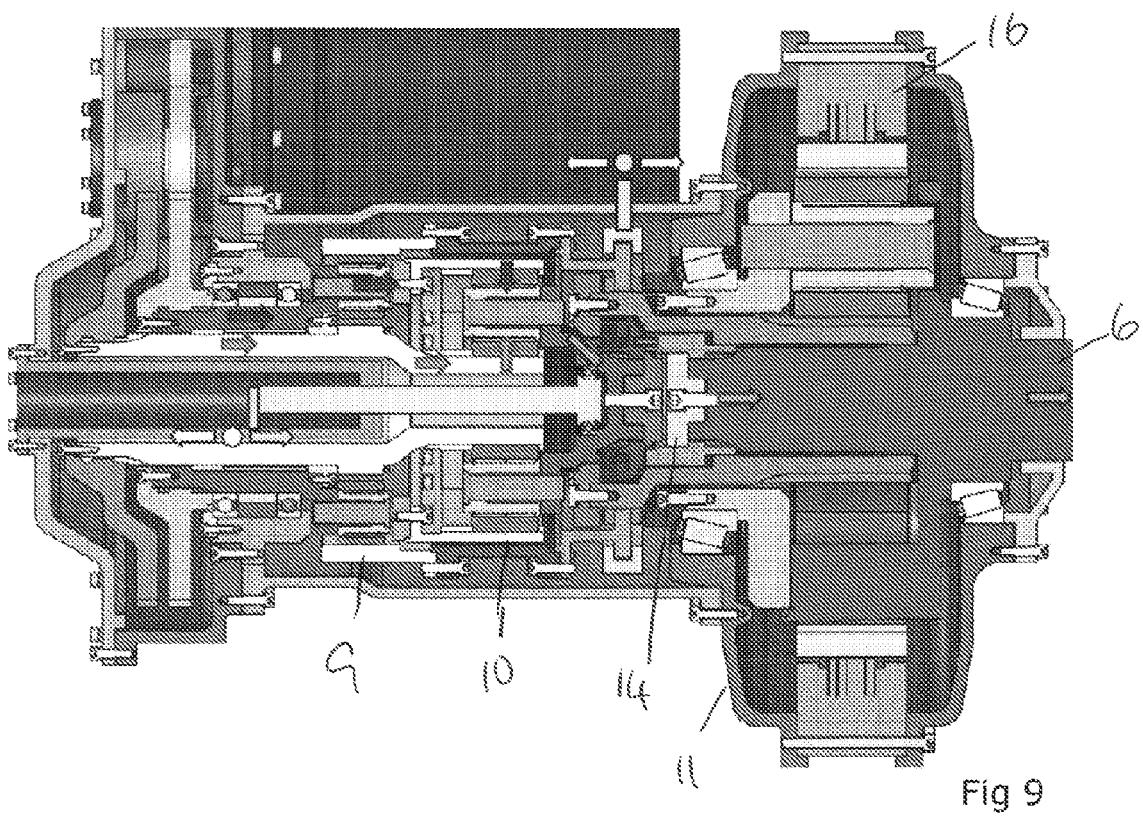

In the third state shown in FIGS. 8 and 9, the third clutch 14 is engaged, but none of the other clutches 12, 13, 15. Brake 16 is released. This arrangement couples the second epicyclic gear 10 between the reduction gears 7, 8 and the output 6, bypassing the first 9 and third 11 epicyclic gears. This removes the reduction in speed due to the third epicyclic gear.

With the second motor 2 initially running at maximum speed in the first sense, the speed of the second motor 2 can be reduced to zero, thus increasing the output 6 speed, and increased to the maximum in the second sense, further increasing the output 6 speed. This is shown in range 39 in FIG. 12.

Once the maximum speed in the second sense is reached by the second motor 2, the motor-gearbox arrangement reaches a point where the fourth state (described below) has the same ratio as the third state. At this speed, the fourth clutch 15 is engaged, and momentarily the transmission is locked in a fixed ratio. The third clutch 14 is then released.

Figure 10:
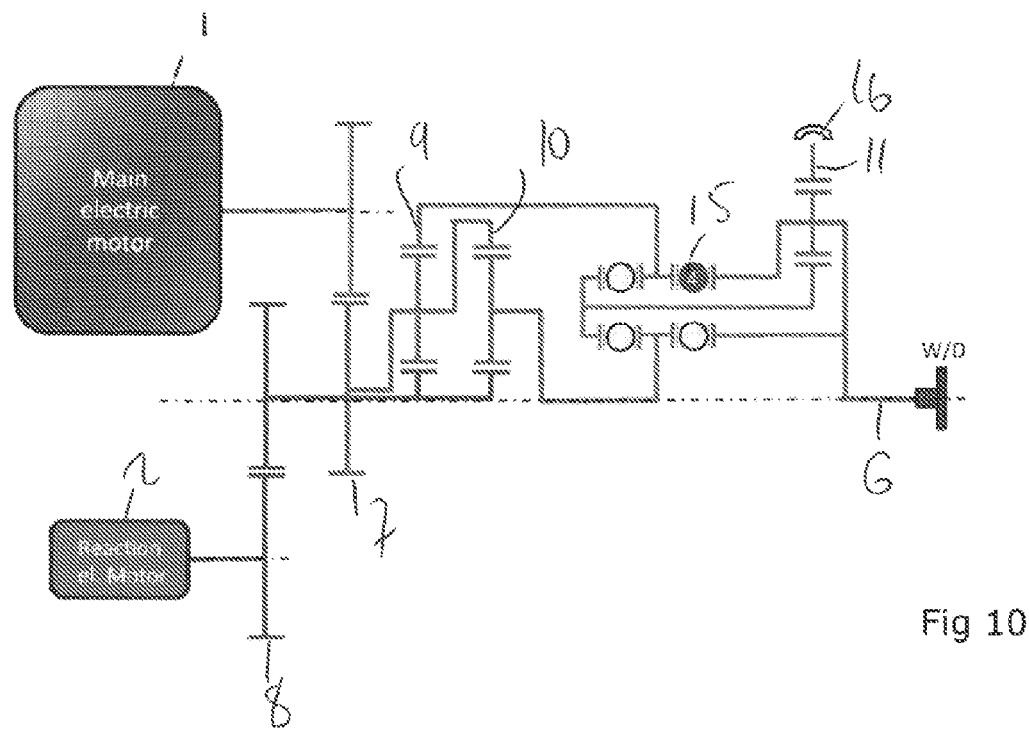
FIGS. 10 and 11 show respectively a schematic and cross sectional view of the motor-gearbox arrangement of FIG. 1, in a fourth state.
Figure 11:
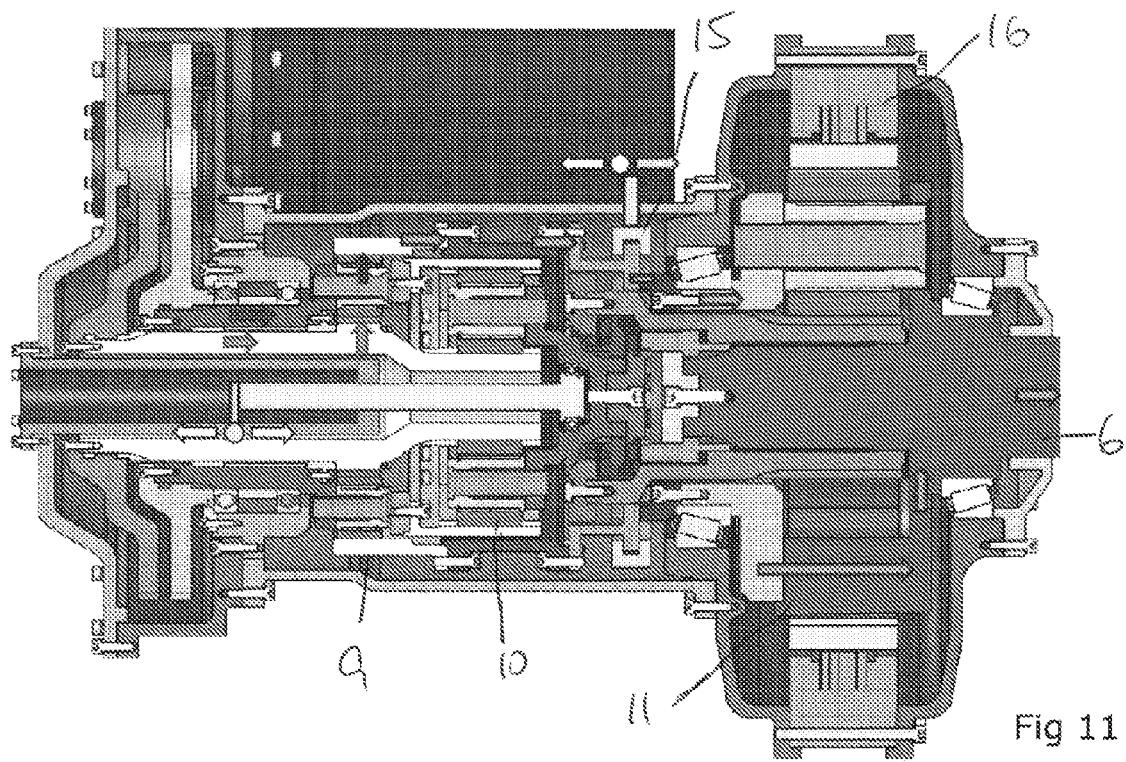

In the fourth state shown in FIGS. 10 and 11, the fourth clutch 14 is engaged, but none of the other clutches 12, 13, 14. Brake 16 is released. This arrangement couples the first epicyclic gear 9 between the reduction gears 7, 8 and the output 6, bypassing the second 10 and third 11 epicyclic gears (although the motion is transmitted to the output through the planet carrier 11b of the third epicyclic gear). This removes the reduction in speed due to the third epicyclic gear.

With the second motor 2 initially running at maximum speed in the second sense, the speed of the second motor 2 can be reduced to zero, thus increasing the output 6 speed, and increased in the second sense, further increasing the output 6 speed. This is shown in range 40 in FIG. 12. It is to be noted that the speed of the second motor 2 in this range can be increased over the maximum for the other stages.

Thus, the four states provide a wide range of ratios, and allow the first motor 1 to run at constant speed over a wide range of output speeds.

This arrangement is efficient, as for a nominal power rating based on an ICE power source, for a vehicle the various components can be sized approximately as follows:

The engine and generator at 70% of nominal power;
The first motor at 140% of nominal power; and
The second motor at 40% of nominal power.

A battery pack can be provided sized dependent on the duty cycle of the vehicle. This arrangement allows for peak loads to be accommodated and convenient zero emissions operation from the battery when required.

As such, this is a convenient sizing for many vehicles, especially given that the engine only needs to be 70% of the nominal power rating (rather than 100% if it were used as a direct power source to drive the vehicle wheels). This can allow for a reduction in emissions due to the use of a smaller engine running at steady state.

Given that the transmission will be operating at optimum tractive effort, drive line efficiency can also be improved. The proposed arrangement has few parts to wear out compared with transmissions including torque converters, friction clutches or synchronisers. Operation of the transmission is continuous and smooth with no shock loads. Driver fatigue is reduced as the transmission is automatic. It will be possible to install this arrangement in the driveline of current vehicles without the need to change drive axles or braking systems. No separate retarder may be needed.

Figure 13:
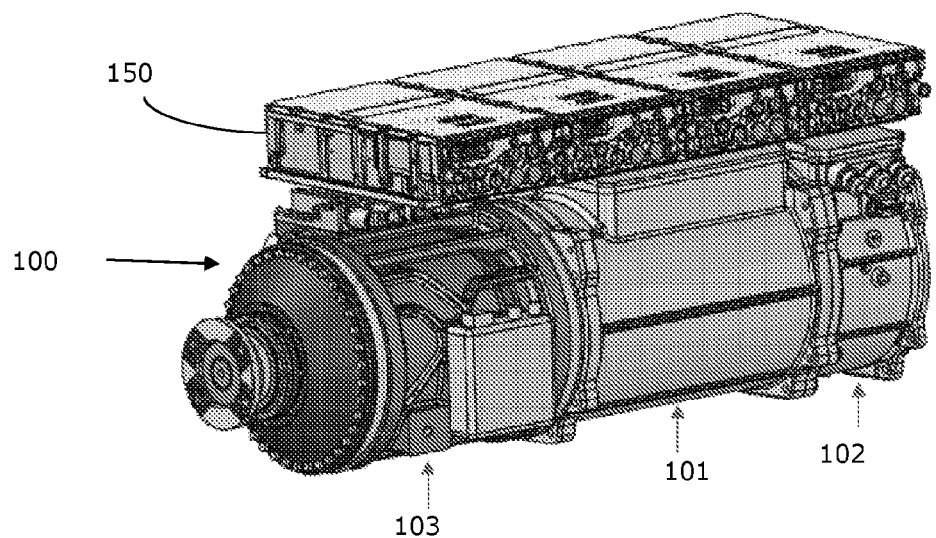
FIG. 13 shows a perspective view of a motor-gear arrangement in accordance with a second embodiment of the invention.
Figure 14:
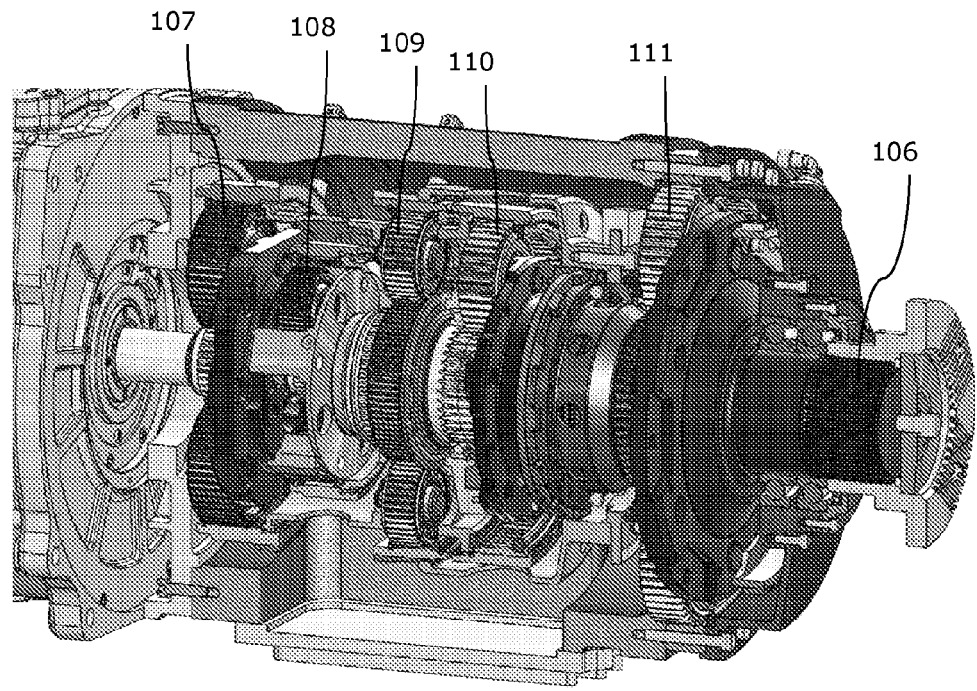
FIG. 14 shows a partially cut away view of the motor-gear arrangement of FIG. 13.

FIGS. 13 and 14 show a second embodiment of the invention that functions largely in the same manner as the first embodiment. Equivalent features have been depicted with corresponding reference numerals, raised by 100.

A 300 kW motor-gear arrangement, including power convertors is shown in FIG. 13. It comprises two coaxial motors, the main motor 101 (225 Kw) and a variator motor 102 (75 Kw), which drives coaxially through the centre of the main 102 motor. Each motor 101, 102 drives through a speed reducing gear (107, 108 respectively) to the coaxially twin input of the two sets of epicyclic gears 109, 110). The output of the epicyclic gears directly drives the output prop shaft 106 as described in the previous embodiment. Power electronics 150 for the motors 101, 102 are mounted atop the motor-gear arrangement The mechanical layout of gears, dog clutches and operating mechanism is arranged in a compact coaxial arrangement, achieved by the use of multi planet flexible pin epicyclic gear designs. The gearbox 103 is less than the motor diameter and volume, whilst delivering 15 times the motor torque. The mechanical transmission is designed to be simple, robust and reliable, being built with inherently fewer potential failure modes, no synchronisers, no friction clutches, no rotor cooling seals, no double engagement failure modes, typically associated with such transmissions. The selected motors are AEM Ltd 8500 rpm switched reluctance (SR) machines, 100% recyclable, robust to passive rectification and over voltage failure and that use no rare-earth materials. Collectively the motor-gear arrangement is designed to be robust, reliable and compact to match the durability requirements of the long-haul heavy goods vehicle (HGV) applications.

Figure 15:
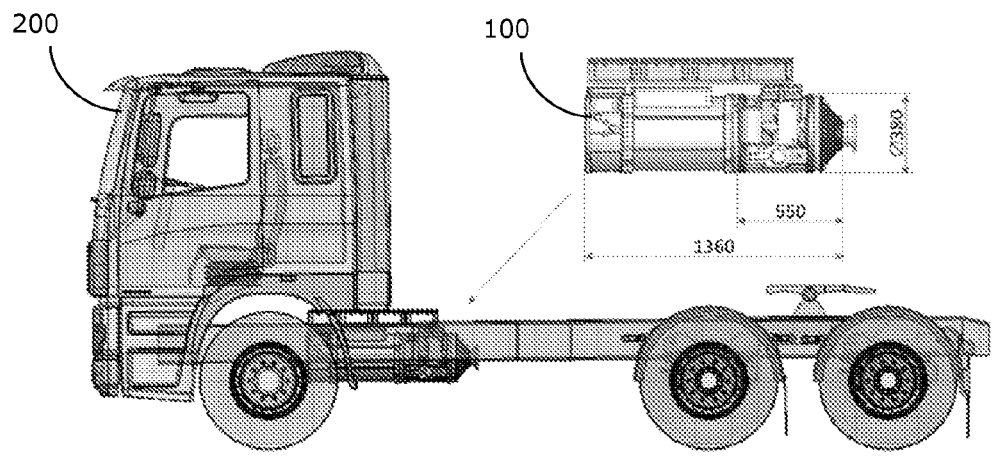
FIG. 15 shows a side elevation of a heavy goods vehicle with the motor gear arrangement of FIG. 13 being installed thereon.
Figure 16:
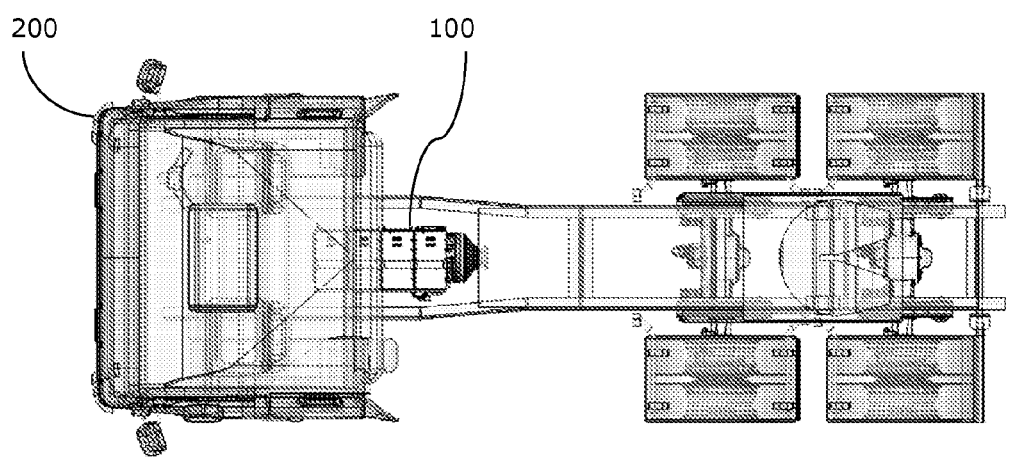
FIG. 16 shows a plan view of the vehicle shown in FIG. 15, with the motor-gear arrangement in place.

The motor-gear arrangement 100 is contained within a 400 mm diameter by 1.3 m long envelope, allowing it to be installed between the chassis rails of a 44 tonne HGV 200, as shown in FIGS. 15 and 16 of the accompanying drawings, with the output 106 connected directly to the existing prop-shaft, without any further vehicle drive line changes. The motor-gear arrangement can be applied across the full range of class 8 (in the US truck classes) vehicles.

Figure 17:
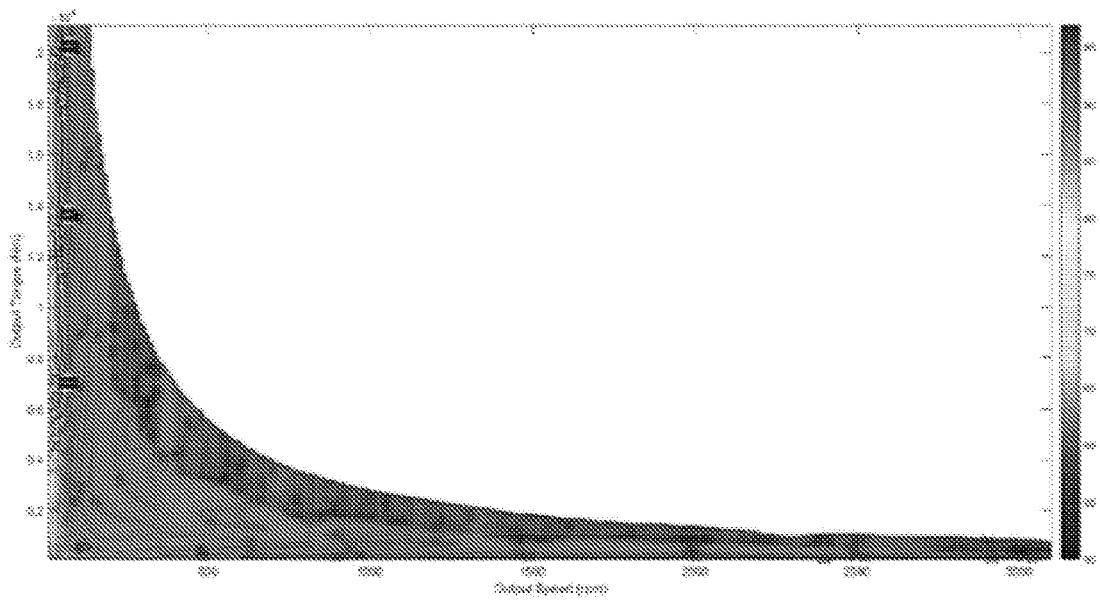
FIGS. 17 and 18 are graphs of efficiency for different motor speeds and torques for the vehicle of FIG. 15 with the motor-gear arrangement of FIG. 13 installed.
Figure 18:
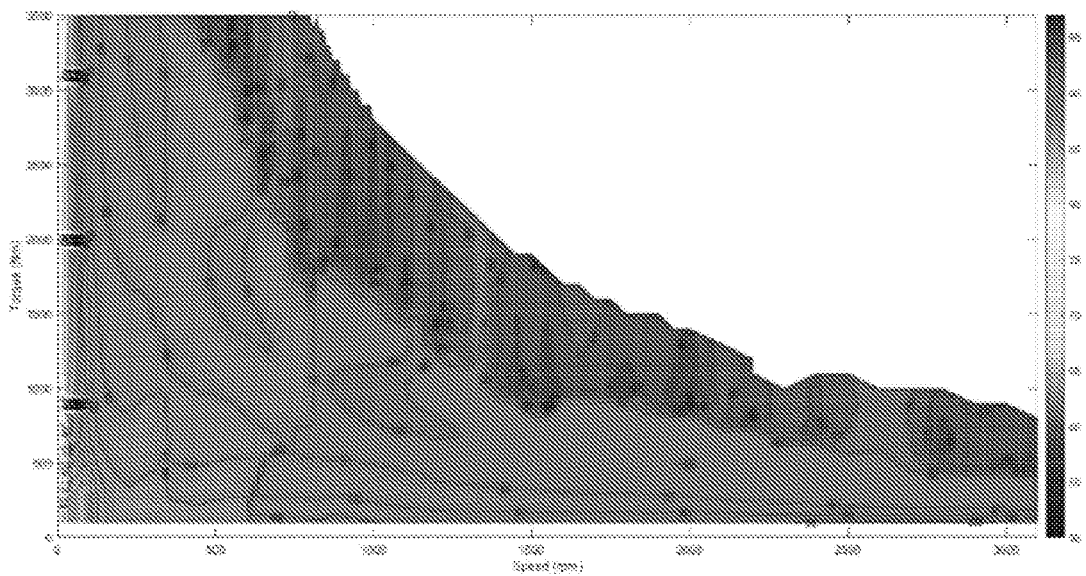

A digital model was constructed for the 44-tonne truck running on a typical duty cycle, ("*Comparison of hydrogen and battery electric trucks*" Transport & Environment June 2020, Fedor Unterlohner) driven by the motor-gear arrangement 100. From this model, the efficiency map illustrated in FIGS. 17 and 18 were constructed, which gave an extraordinary high calculated efficiency of 91.1% (Heavy Heavy-duty Diesel Truck HHDDT composite test). This high efficiency is delivered by the motor-gear arrangement's capability to operate the electric motors at the most efficient points, avoiding the very low motor efficiencies associated with a fixed ratio drive, to harvest the maximum regenerative energy from the duty cycle and minimise time spent in the regenerative modes. The digital transmission model was further used to establish that the dynamic performance of range change and clutch engagements could be achieved. This resulted in the definition of the dog-teeth profile and a control input sequence to the motor torques to allow rapid engagement and disengagement.

The calculated performance of the motor-gear arrangement 100 targeted at the 44-ton 6×4 tractor unit 200 is listed in the table below. All characteristics meet or exceed the 400 Kw Diesel/10-speed drive train with the exception of the gradients achieved at 50, 60 & 100 Kph, which were limited by the installed power, 300 kW versus the ICE (internal combustion engine) 400 kW unit. The motors 101, 102 can operate transiently up to peak power 650 Kw and gradeability will match the ICE under most practical operating conditions. The defining characteristics of this motor-gear arrangement are high stall torque, extreme start ability, and very high duty cycle efficiency, all achieved within a compact size envelope.

| | Calculated Performance for 44 tonne HGV |
|---|---|
| Continuous Power | 300 kW |
| Peak Power | 650 kW |
| Stall Torque | 37 kNm prop shaft torque |
| Efficiency | 90.2% (Worldwide Harmonised Light Vehicle Test Procedure WLTP), 91.1% (HHDDT Composite) |
| Seamless shifting | There is no torque interruption during shifting |
| Gradient @50 kph | 2.7 degrees |
| Gradient @60 Kph | 2.2 degrees |
| Gradient @100 kph | 1.3 degrees |
| Acceleration | 41.4 sec. to 80 kph |
| Vmax | 120 kph (gradients up to 0.75%) |
| Start ability | 39% (21.3 degrees) |

Currently there are three proposed electric drive solutions on the market for heavy vehicles.
1. A large direct-drive motor connected directly to the axle input. Comparison bench mark.
2. Electrically driven (multi) two-speed axles.
3. A large motor connected to the axle input via a multi-speed gearbox.

We have undertaken a detailed performance comparison using the digital model results of the motor-gear arrangement and public data from a proprietary large direct drive motor. The results are listed below.

The motor-gear arrangement has 15% more power, 5.4 times peak, 5.6 times rated output torque.

The motor-gear arrangement is 1.44 times the mass but only 80% of the volume.

The motor-gear arrangement can launch a 40-tonne vehicle on a gradient of 39%. The direct drive is limited to 8 tonnes.

The motor-gear arrangement will give a 91% efficiency (HHDDT composite) far higher than any other electric drive units, which are typically less than 80%.

With the two-speed multi-axle solution it is possible to get an improvement in gradeability, but this solution is limited to 26 Tonne gross vehicle weight (GVW) maximum, to maintain a continuous traction curve. This solution also suffers from a significantly lower duty cycle efficiency due to the operating the motors in the very low efficiency regimes.

A motor with a multi-speed transmission can match the motor-gear arrangement on gradeability but would suffer lower duty cycle efficiency due to the motor's low efficiency regimes.

The motor-gear arrangement is superior over the alternative solutions:
  direct drive: volume, very poor gradeability and efficiency,
  two-speed axle: volume, poor gradeability and efficiency,
  multi-speed transmission: volume and efficiency.
The motor-gear arrangement provides:
  Instant and uninterrupted torque and power delivery, unrivalled speed/torque ratio>15, feels like a direct drive, performs like multi-speed.
  Wide operating efficiency, Variable ratio drive extends the efficient operating window of the base electric machine.
  Compact, power dense, robust and reliable design.
  Easily introduced into existing vehicle drivelines
The motor-gear arrangement is a novel innovative electro/mechanical transmission concept able to drive the very largest HGVs, (26-44 Tonne plus) purely electrically, with zero tail pipe-emissions, whilst maintaining the vehicle's full-traction performance envelope at a very high efficiency.

Very importantly the motor-gear arrangement with its high efficiency, and low volume, has the capability to unlock the design solution for a practical Fuel Cell 44-ton tractor unit by providing an adequate driving range with an acceptable unladen vehicle weight.

It is claimed:

1. A motor-gearbox arrangement, comprising a gearbox comprising:
  a first input;
  a second input;
  an output;
  a plurality of epicyclic gears each comprising the following members:
  a sun gear;
  a planet carrier;
  a plurality of planet gears carried on the planet carrier and each engaging the sun gear; and
  an annular gear engaging each of the planet gears; and
  a plurality of clutches, the plurality of clutches being arranged so as to selectively couple the first input and the second input to the output via the plurality of epicyclic gears;
  the motor-gearbox arrangement further comprising:
  a first electric motor coupled to the first input so as to rotate the first input; and
  a second electric motor coupled to the second input so as to rotate the second input;
  in which the clutches and the epicyclic gears define a plurality of states of the gearbox in which in each state the first input and the second input are coupled to the output through at least one of the epicyclic gears to form a gear train, the plurality of states differing from each other in at least one of the selection of the epicyclic gears which form the gear train and the selection of the members of each epicyclic gear which are connected to the first input, the second input, and the output and to other epicyclic gears of the gear train;
  in which the gearbox has a ratio, being a number of turns of the output for a single turn of the first input, in which the ratio varies dependent upon the rotational speed of the second input; and
  in which there are at least one pair of states such that, at a crossover rotational speed of the second input, the ratio of the gearbox is the same for the pair of states.

2. The motor-gearbox arrangement of claim 1, in which the states form a sequence from a first state through at least one intermediate state to a final state, which each intermediate state forming a pair with the state before and after it in the sequence.

3. The motor-gearbox arrangement of claim 2, in which the states of each pair are such that the ratio varies with rotational speed of the second input in opposite senses in each state of the pair.

4. The motor-gearbox arrangement of claim 1, comprising a brake for at least one of the epicyclic gears, the brake being selectively applicable so as to selectively brake a member of the epicyclic gear.

5. The motor-gearbox arrangement of claim 1, in which the epicyclic gears comprise first, second and third epicyclic gears, and the arrangement comprises first, second, third and fourth clutches, in which:
  the first input is coupled to the planet carrier of the first epicyclic gear and the annular gear of the second epicyclic gear; the second input is coupled to the sun gears of the first and second epicyclic gear;
  the first clutch selectively couples the planet carrier of the second epicyclic gear to the sun gear of the third epicyclic gear;
  the second clutch selectively couples the annular gear of the first epicyclic gear to the sun gear of the third epicyclic gear;
  the third clutch selectively couples the planet carrier of the second epicyclic gear to the output; the fourth clutch selectively couples the annular gear of the first epicyclic gear to the planet carrier of the third epicyclic gear; and
  the annular gear of the third epicyclic gear is provided with a brake; and the planet carrier of the third epicyclic gear is coupled to the output.

6. The motor-gearbox arrangement of claim 5, in which, in a first state, the first clutch engages so as to couple the planet carrier of the second epicyclic gear to the sun gear of the third epicyclic gear, and the second, third and fourth clutches disengage so as to not couple anything, and the brake of the annular gear of the third epicyclic gear brakes the annular gear of the third epicyclic gear.

7. The motor-gearbox arrangement of claim 6 in which, in a second state, the second clutch engages so as to couple the annular gear of the first epicyclic gear to the sun gear of the third epicyclic gear, with the first, third and fourth clutches disengaged so as to not couple anything, and the brake of the annular gear of the third epicyclic gear brakes the annular gear of the third epicyclic gear.

8. The motor-gearbox arrangement of claim 7, in which, in a third state the third clutch engages so as to couple the planet carrier of the second epicyclic gear to the output, and the first, second and fourth clutches disengage so as to not couple anything.

9. The motor-gearbox arrangement of claim 8, in which, in a fourth state the fourth clutch engages so as to couple the annular gear of the first epicyclic gear to the planet carrier of the third epicyclic gear, and the first, second, and third clutches disengage so as to not couple anything.

10. The motor-gearbox arrangement of claim 1, in which the first and second electric motors are mounted coaxially relative to each other, such that an output of one motor rotates within an output of the other motor, with the outputs of each of the motors being coaxial.

11. A method of controlling a motor-gearbox arrangement, the motor-gearbox arrangement comprising a gearbox comprising:
a first input;
a second input;
an output;
a plurality of epicyclic gears each comprising the following members:
a sun gear;
a planet carrier;
a plurality of planet gears carried on the planet carrier and each engaging the sun gear; and
an annular gear engaging each of the planet gears; and
a plurality of clutches, the plurality of clutches being arranged to as to selectively couple the first input and the second input to the output via the plurality of epicyclic gears;
the motor-gearbox arrangement further comprising:
a first electric motor coupled to the first input so as to rotate the first input; and
a second electric motor coupled to the second input so as to rotate the second input;
in which the clutches and the epicyclic gears define a plurality of states of the gearbox in which in each state the first input and the second input are coupled to the output through at least one of the epicyclic gears to form a gear train, the plurality of states differing from each other in at least one of the selection of the epicyclic gears which form the gear train and the selection of the members of each epicyclic gear which are connected to the first input, the second input, and the output and to other epicyclic gears of the gear train;
in which the gearbox has a ratio, being a number of turns of the output for a single turn of the first input, in which the ratio varies dependent upon the rotational speed of the second input;
in which there is at least one pair of states such that, at a crossover rotational speed of the second input, the ratio of the gearbox is the same for the pair of states; and
the method comprising varying the rotational speed of the second motor so as to vary the ratio of the gearbox.

12. The method of claim 11, in which the epicyclic gears comprise first, second and third epicyclic gears, and the arrangement comprises first, second, third and fourth clutches, in which:
the first input is coupled to the planet carrier of the first epicyclic gear and the annular gear of the second epicyclic gear;
the second input is coupled to the sun gears of the first and second epicyclic gear;
the first clutch selectively couples the planet carrier of the second epicyclic gear to the sun gear of the third epicyclic gear;
the second clutch selectively couples the annular gear of the first epicyclic gear to the sun gear of the third epicyclic gear;
the third clutch selectively couples the planet carrier of the second epicyclic gear to the output;

the fourth clutch selectively couples the annular gear of the first epicyclic gear to the planet carrier of the third epicyclic gear;
the annular gear of the third epicyclic gear is provided with a brake; and
the planet carrier of the third epicyclic gear is coupled to the output;
in which, in a first state, the first clutch engages so as to couple the planet carrier of the second epicyclic gear to the sun gear of the third epicyclic gear, and the second, third and fourth clutches disengage so as to not couple anything, and the brake of the annular gear of the third epicyclic gear brakes the annular gear of the third epicyclic gear;
in which, in a second state, the second clutch engages so as to couple the annular gear of the first epicyclic gear to the sun gear of the third epicyclic gear, with the first, third and fourth clutches disengaged so as to not couple anything, and the brake of the annular gear of the third epicyclic gear brakes the annular gear of the third epicyclic gear;
in which, in a third state the third clutch engages so as to couple the planet carrier of the second epicyclic gear to the output, and the first, second and fourth clutches disengage so as to not couple anything; and
in which, in a fourth state the fourth clutch engages so as to couple the annular gear of the first epicyclic gear to the planet carrier of the third epicyclic gear, and the first, second, and third clutches disengage so as to not couple anything;
the method comprising operating the motor-gearbox arrangement in the first to fourth states sequentially in order.

13. The method of claim 12, comprising:
starting with the first and second inputs at rest, and with the motor-gearbox arrangement in the first state;
increasing the rotational speed of the second input from zero to a first maximum speed in a first rotational direction whilst increasing the rotational speed of the first input from zero to a second maximum speed in a second rotational direction.

14. The method of claim 13, comprising then, with the first input constant at the second maximum speed, reducing the speed of the second input to zero and then to the first maximum speed in the first rotational direction.

15. The method of claim 14, comprising then placing the arrangement in the second state and reducing the speed of the second input to zero and then to the second maximum speed in the second rotational direction.

16. The method of claim 15, comprising then placing the arrangement in the third state and reducing the speed of the second input to zero and then to the first maximum speed in the first rotational direction.

17. The method of claim 16, comprising then placing the arrangement in the fourth state and reducing the speed of the second input to zero and then to the second maximum speed in the second rotational direction.

* * * * *